(12) United States Patent
Vai et al.

(10) Patent No.: US 11,173,787 B2
(45) Date of Patent: Nov. 16, 2021

(54) VIRTUAL HUMAN-MACHINE INTERFACE SYSTEM AND CORRESPONDING VIRTUAL HUMAN-MACHINE INTERFACE METHOD FOR A VEHICLE

(71) Applicant: MARELLI AUTOMOTIVE LIGHTING ITALY S.P.A., Turin (IT)

(72) Inventors: Carlo Vai, Castelnuovo Don Bosco (IT); Carlo Gallo, Moncalieri (IT); Andrea Novello, Orbassano (IT); Sebastiano Cicciarella, Turin (IT)

(73) Assignee: MARELLI AUTOMOTIVE LIGHTING ITALY S.p.A., Venaria Reale (IT)

( * ) Notice: Subject to any disclaimer, the term of this patent is extended or adjusted under 35 U.S.C. 154(b) by 0 days.

(21) Appl. No.: 16/637,411

(22) PCT Filed: Aug. 7, 2018

(86) PCT No.: PCT/IB2018/055924
§ 371 (c)(1),
(2) Date: Feb. 7, 2020

(87) PCT Pub. No.: WO2019/030660
PCT Pub. Date: Feb. 14, 2019

(65) Prior Publication Data
US 2020/0192466 A1    Jun. 18, 2020

(30) Foreign Application Priority Data

Aug. 8, 2017    (IT) ........................ 102017000091628

(51) Int. Cl.
*B60K 37/06*    (2006.01)
*G06F 3/01*    (2006.01)
(Continued)

(52) U.S. Cl.
CPC .............. *B60K 37/06* (2013.01); *G06F 3/011* (2013.01); *G06F 3/0425* (2013.01);
(Continued)

(58) Field of Classification Search
CPC .... B60K 35/00; B60K 37/06; B60K 2370/11; B60K 2370/143; B60K 2370/146;
(Continued)

(56) References Cited

U.S. PATENT DOCUMENTS

2014/0145933 A1    5/2014    Chae et al.
2016/0274669 A1    9/2016    Hsiao et al.
(Continued)

FOREIGN PATENT DOCUMENTS

DE    102009036371 A1    4/2011

OTHER PUBLICATIONS

International Search Report and Written Opinion of the International Searching Authority for PCT International Application No. PCT/IB2018/055924 dated Oct. 9, 2018.

*Primary Examiner* — Nelson M Rosario
(74) *Attorney, Agent, or Firm* — Howard & Howard Attorneys PLLC

(57) ABSTRACT

A virtual human-machine interface system for a vehicle including at least one projection surface disposed within the vehicle and a corresponding virtual human-machine interface method for a vehicle are provided. The virtual human-machine interface system comprises at least one micromirror projection device for projecting an image on the at least one projection surface, at least one sensor for detecting commands given by a user by determining the position of a part of the user's body within the vehicle, and a control unit for controlling the human-machine interface system. The
(Continued)

position of the image projected by the at least one projection device within the vehicle may be modified by a specific command given by the user.

11 Claims, 4 Drawing Sheets

(51) Int. Cl.
*G06F 3/042* (2006.01)
*G06F 3/0484* (2013.01)

(52) U.S. Cl.
CPC ...... *G06F 3/04845* (2013.01); *B60K 2370/11* (2019.05); *B60K 2370/143* (2019.05); *B60K 2370/146* (2019.05); *B60K 2370/1468* (2019.05); *B60K 2370/1472* (2019.05); *B60K 2370/182* (2019.05); *B60K 2370/23* (2019.05); *B60K 2370/48* (2019.05); *B60K 2370/66* (2019.05); *B60K 2370/744* (2019.05)

(58) Field of Classification Search
CPC .... B60K 2370/1468; B60K 2370/1472; B60K 2370/151; B60K 2370/182; B60K 2370/23; B60K 2370/29; B60K 2370/334; B60K 2370/349; B60K 2370/48; B60K 2370/52; B60K 2370/66; B60K 2370/736; B60K 2370/744; G06F 3/011; G06F 3/0425; G06F 3/04845
See application file for complete search history.

(56) References Cited

U.S. PATENT DOCUMENTS

2018/0352204 A1* 12/2018 Fujita .................. H04N 9/3188
2019/0302453 A1* 10/2019 Oshima ................ H04N 9/3194

* cited by examiner

VIRTUAL HUMAN-MACHINE INTERFACE SYSTEM AND CORRESPONDING VIRTUAL HUMAN-MACHINE INTERFACE METHOD FOR A VEHICLE

CROSS-REFERENCE TO RELATED APPLICATIONS

The present application is a National Stage of International Patent Application No. PCT/IB2018/055924, filed Aug. 7, 2018, which claims priority to and all the benefits of Italian Patent Application No. 102017000091628, filed on Aug. 8, 2017, both of which are hereby expressly incorporated herein by reference in their entirety.

BACKGROUND OF THE INVENTION

1. Field of Invention

The present invention relates, in general, to the field of human machine interfaces for vehicles and, in particular, to a virtual human-machine interface system and to a corresponding virtual human-machine interface method for a vehicle.

2. Description of Related Art

In known human-machine interfaces for vehicles, a plurality of physical switches pre-installed in the passenger compartment of the vehicle are commonly used to allow interaction between the users on board the vehicle and the various electronic and mechanical devices installed on the vehicle. Some examples may be electrical switches installed in the doors of the vehicles that allow movement of the windows, switches for turning the lights on and off and buttons for navigation systems.

In recent human-machine interfaces, the aforementioned physical switches have largely been replaced by touch screens or similar devices.

Disadvantageously, compared to physical switches, touch screens require more attention from users in entering commands, have significantly higher costs and their position inside the vehicle is fixed, with consequent problems of congestion of the internal surfaces of the passenger compartment.

To provide information to vehicle users, such human-machine interfaces require the presence of screens and/or visual indicators such as LEDs or light bulbs.

Disadvantageously, the aforesaid solutions have limited possibility of customization by the user. Furthermore, in stages following the sale of the vehicle, they do not even allow vehicle manufacturers to make substantial changes and updates to the basic architecture of the human-machine interface.

In further known human-machine interfaces, especially for medium and high category vehicles, voice commands and gesture recognition devices are used.

Voice commands require low user attention to impart commands but allow a limited number of operations to be performed and are highly influenced by environmental noise.

Gesture recognition devices, on the other hand, are still complex and not very intuitive. Usually, these devices include a camera to recognize the driver's finger movements and infrared sensors that work even in the dark. Disadvantageously, gesture recognition algorithms are complex, infrared sensors are sensitive to direct exposure to the sun and in many cases do not detect the correct command or detect commands not really given by the user. In addition, each command to be sent is uniquely linked to the gesture to be executed; therefore, the user is necessarily obliged to learn the gesture in such a way as to make it recognizable to the machine.

To solve these problems, some solutions aiming to "virtualize" human-machine interfaces for vehicles were proposed. For example, human-machine interfaces are known which include an image generator such as a cathode ray tube or an optical projection unit which includes projection lenses for projecting an image into the vehicle.

The drawback of the aforesaid optical projection units which comprise projection lenses consists in the fact that, precisely because of said projection lenses, they have a poor definition and the limitation of being capable of projecting images without distortion only on flat surfaces.

This limit considerably compromises the possibility of customizing the interface and requires that predetermined flat projection surfaces are provided during the design steps of the vehicle interiors, with a consequent significant negative impact on the aesthetics of said interiors.

SUMMARY OF THE INVENTION

An object of the present invention is therefore to propose a virtual human-machine interface system and a corresponding virtual human-machine interface method for a vehicle which allow the use of algorithms and components that are not complex to project images even on non-flat surfaces, to prevent the installation of touch screens and switches, not to be influenced by direct exposure to the sun and vehicle vibrations, and to allow a high degree of customization.

For example, allowing the aesthetic aspect of the human-machine interface (color, style) and its position inside the vehicle to be modified at any time during the life cycle of the vehicle, through software updates without requesting modifications to the hardware on board the vehicle, and also allowing the various interfaces to be moved simply by dragging them to different parts of the passenger compartment.

The above and other objects and advantages are achieved, according to an aspect of the present invention, by the virtual human-machine interface system and the virtual human-machine interface method for a vehicle having the features described below. Preferred embodiments of the invention are described as well.

BRIEF DESCRIPTION OF THE DRAWINGS

The functional and structural features of some preferred embodiments of a virtual human-machine interface system and of a corresponding virtual human-machine interface method for a vehicle according to the present invention will now be described. Reference will be made to the accompanying drawings, in which.

DETAILED DESCRIPTION OF THE INVENTION

Figure 1:
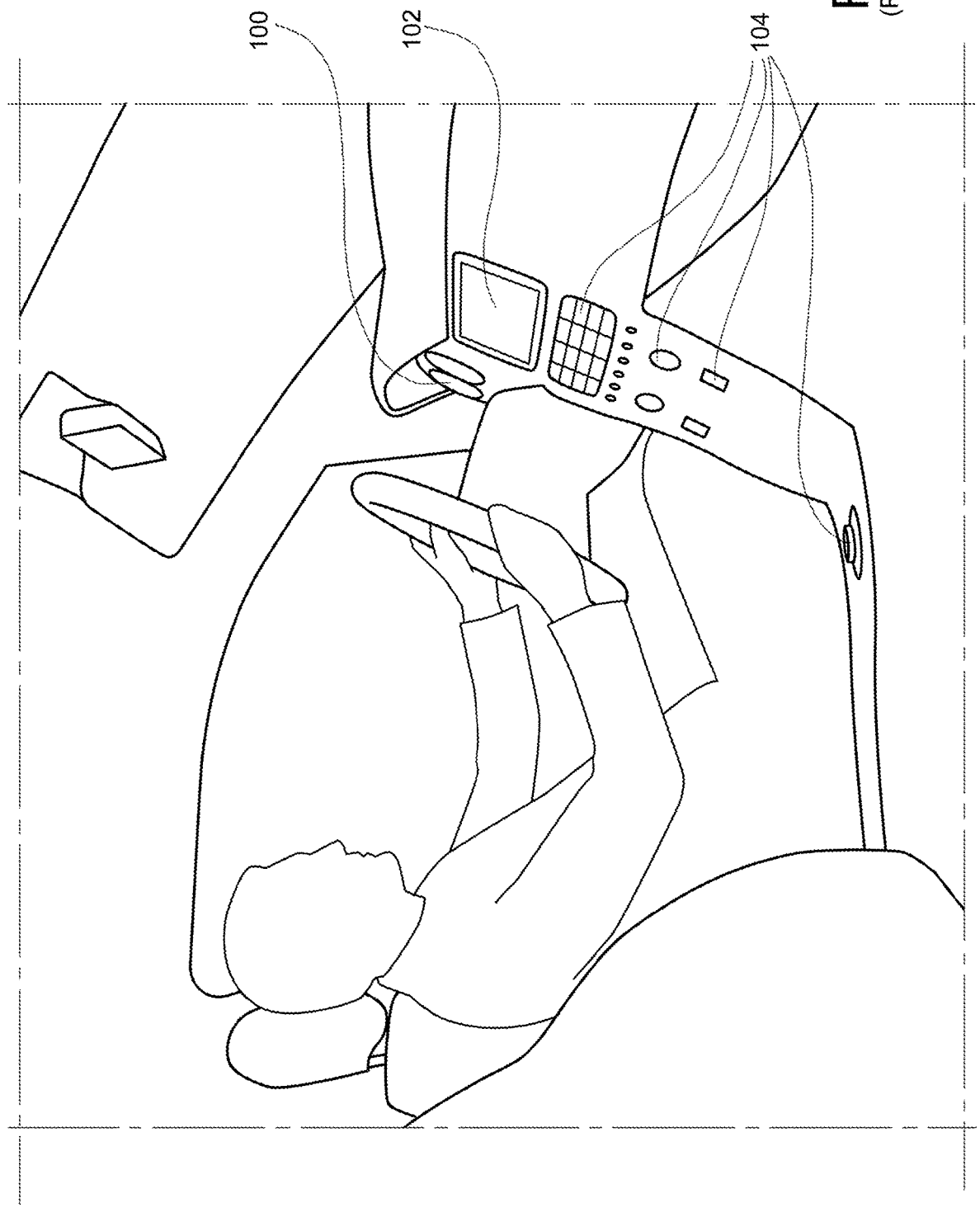
FIG. 1 shows by way of example a human-machine interface made according to the prior art.

Before explaining in detail a plurality of embodiments of the present invention, it should be noted that the present invention is not limited in its application to the construction details and to the configuration of the components presented in the following description or shown in the drawings. The present invention may also have different embodiments and be implemented or carried out in different ways. It should also be understood that the phraseology and terminology are for descriptive purpose and are not to be construed as limiting. The use of "include" and "comprise" and variations thereof are intended as including the elements cited thereafter and their equivalents, as well as additional elements and equivalents thereof.

Referring initially to FIG. 1, a typical human-machine interface for a vehicle is illustrated which includes an analog dashboard 100, a screen 102 and a plurality of physical switches and buttons 104.

Figure 2:
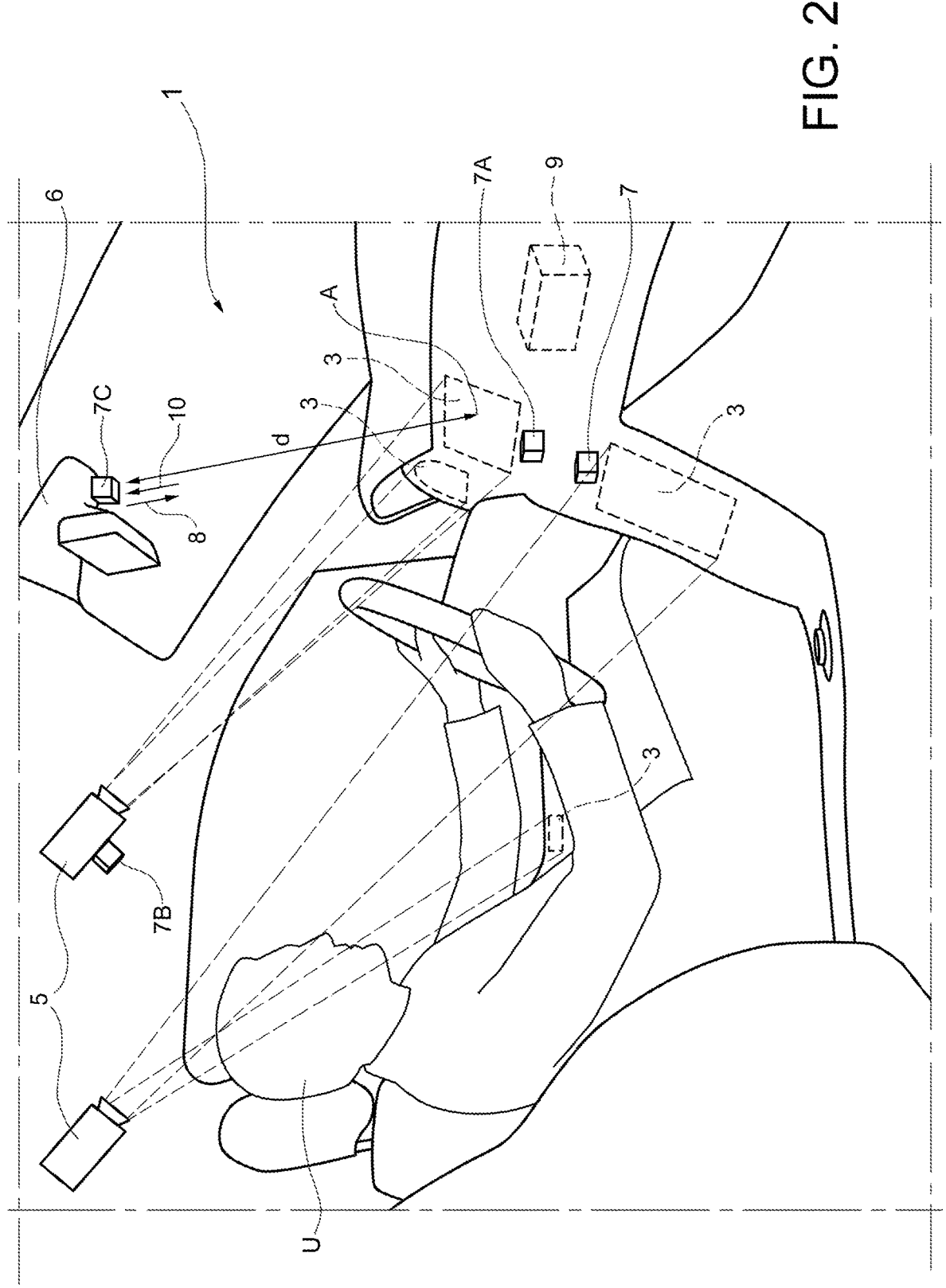
FIG. 2 shows a first embodiment of a virtual human-machine interface system when installed on board a vehicle.
Figure 3:
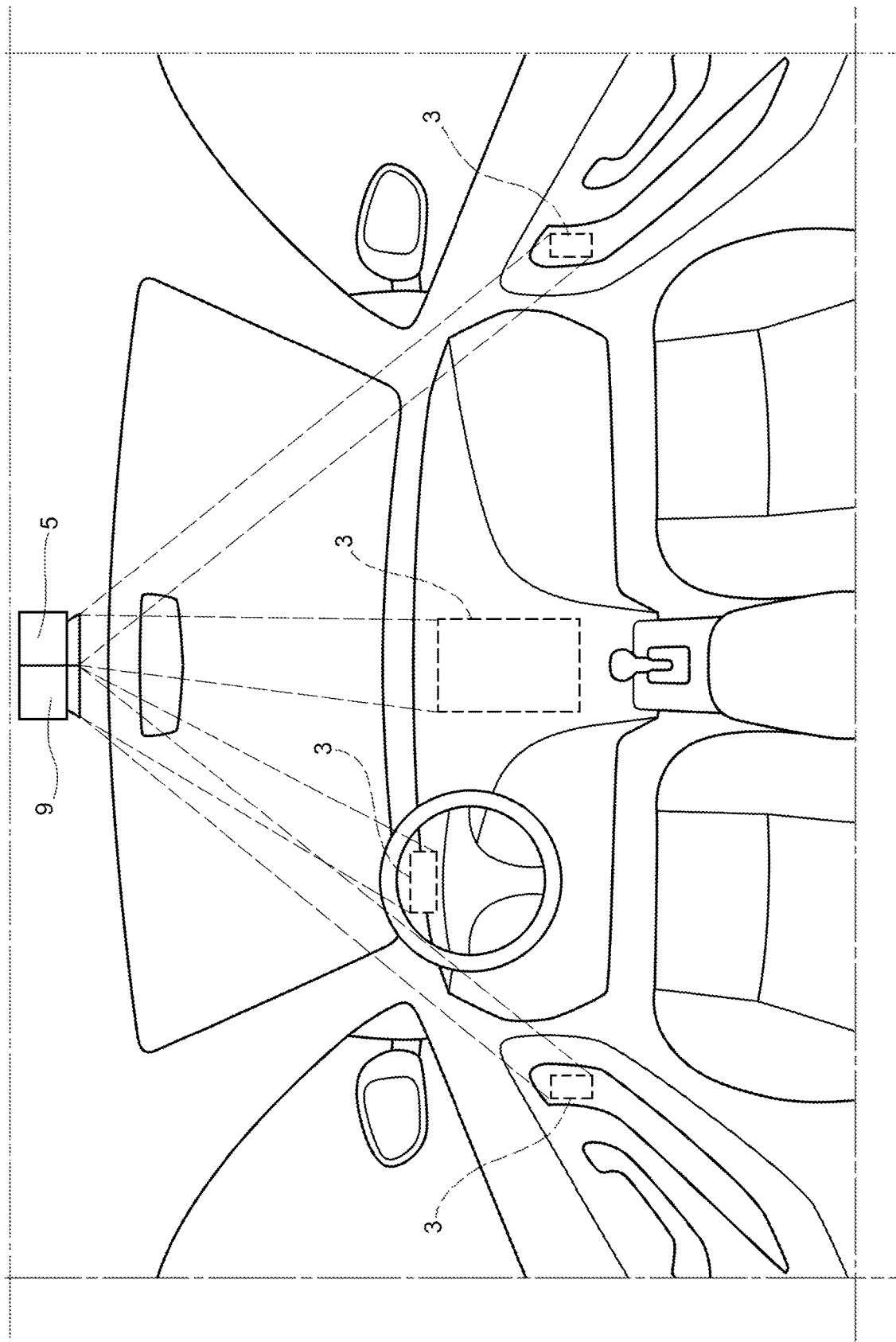
FIG. 3 shows a further embodiment of a virtual human-machine interface system.

Referring instead to FIG. 2, a first embodiment of a virtual human-machine interface system 1 for a vehicle according to the present invention is illustrated.

Such a virtual human-machine interface system 1 includes at least one projection surface 3 disposed within the vehicle.

For example, the projection surfaces 3 shown in the embodiment of FIG. 2 are four. In particular, one of them is placed in front of the steering wheel in place of the classic analog or digital dashboard, two of them on the central dashboard of the passenger compartment and one of them on an armrest of a door. Clearly, the number and arrangement of such projection surfaces 3 in other embodiments not shown may be different. For example, the projection surface may also be provided to project an image onto the inner roof of a vehicle.

The human-machine interface system 1 comprises at least a micro-mirror projection device 5 ("Micromirror MEMS"), arranged to project an image onto said at least one projection surface 3. Such a micro-mirror projection device 5 can project an image both on a flat projection surface 3 and on a non-flat projection surface 3.

Clearly, the term "micro-mirror projection device 5" means both a projection device 5 comprising a single micro-mirror and a projection device 5 comprising a plurality of micro-mirrors.

Advantageously, in such micro-mirror projection device 5, each micro-mirror can be switched not only between two states but their rotation can be continuous, allowing control of intensity and direction of the incident light. For example, such a projection device 5 may be arranged on the inside roof of the passenger compartment or near a rear-view mirror 6. Furthermore, multiple projection devices 5 may be collected in a single casing for projecting several images simultaneously from the same envelope and consequently minimizing the overall dimensions. It is also possible to use multiple projection devices 5 in different positions and/or use mobile projection devices 5, if more images are required to be shown to more passengers and/or to move the projection device 5 to change the projection surface 3 on which to project, for example, to move the projection from an overly illuminated (difficult to read) surface to a less illuminated one.

The human-machine interface system 1 further comprises at least one sensor 7 arranged to detect the commands given by a user U by determining the position of a part of the user body inside the vehicle and a control unit 9 arranged for the control of the human-machine interface system 1.

The control unit 9 can be a microprocessor of a control unit arranged to execute a program which implements an algorithm for controlling the interface system. Clearly, the connections between the processing unit and the other elements can be optimized in terms of number and length of the cables, or, the control unit can communicate with the other elements via wireless connections.

Furthermore, the control unit 9 can acquire background illumination of the projection surfaces from brightness sensors (not shown) and can send both the image data to be projected to a respective projection device 5 and the illumination information detected (depending on the surrounding light). In this way, the projection device 5 can generate a respective image having an illumination calibrated on the illumination information of the background on which the image will be projected. The image data may be navigation data (virtual panel) or virtual buttons (virtual switch) for the selection of destinations, etc.

Alternatively, the projection device 5 can project into a part of the dashboard which is the part that is least exposed to ambient lighting.

Moreover, the position of the projected image can be changed manually, at any time, by the user through a simple dragging action of the image, using the fingers. For example, the projection surfaces 3 may be at least two, a first projection surface and a second projection surface, and the image projected by the at least one projection device 5 can be moved from the first projection surface to the second projection surface by dragging the projected image by the user.

In an exemplary embodiment, the dragging action by the user may take place by moving a user's finger in contact with the image projected onto the projection surface towards any direction, the displacement occurring without the contact between the finger and the projected image being lost.

Video signals require a non-negligible bandwidth, so it may be necessary to use parallel interfaces, for example RGB 24. If the control unit 9 is placed near the projection device 5 (for example on the same circuit board), the connection can be short and the parallel interface can be used. In this case, the control unit 9 and the projection device 5 can belong to the same electronic control unit.

On the other hand, if the control unit 9 is not positioned close to the projection device 5, both the projection device 5 and the control unit 9 may comprise a communication module (not shown) which implements a communication protocol (for example, Ethernet), to exchange data and information. In this case, different electronic control units will be present and the presence of a gateway for their interconnection may be necessary.

These last concepts are also applicable between said sensor 7 and the control unit 9.

At least one sensor 7 may be a first vibration sensor which can detect the vibrations generated by a part of the body of a user that contacts the projection surface 3. The first vibration sensor can detect the vibrations transmitted to the projection surface 3, due to the contact of said projection surface 3 with the user U, to detect the position of a part of the user body on said surface projection and determine a respective command given by a user. For example, said first vibration sensor can detect a simple touch or drag of a user's U finger on the projection surface 3. For example, the vibrations detected by said first vibration sensor can be used in "touch recognition" algorithms to detect a touch or drag of a finger on the projection surface 3.

In this way, the accuracy of the detection of the commands given by the user is high and is in no way influenced by the lighting conditions inside the vehicle and direct sunlight.

Clearly, a sensor 7 may be provided for each projection surface.

In a further embodiment, in addition or alternatively to the case in which at least one sensor 7 is a first vibration sensor, at least one sensor 7 may also be a distance sensor 7C which can detect the commands given by the user by determining a distance d of a part of the user's body from the distance sensor 7C, when arranged between said distance sensor 7C and the projection surface 3.

The distance sensor 7C may generate an electromagnetic wave 8 and receive an electromagnetic wave 10 reflected from a reflection area included on a part of the user's body that is placed between said distance sensor and the projection surface 3 (i.e. on the back of the hand) or, an electromagnetic wave 10 reflected directly from a reflection area from the projection surface 3, when no part of the user's body is placed between said distance sensor 7C and the projection surface 3.

The distance sensor 7C can measure a time $\Delta T$ between the generation of the electromagnetic wave 8 and the reception of the reflected electromagnetic wave 10 from the distance sensor 7C, and calculate a distance d between the reflection area and the distance sensor based on said time $\Delta T$ and at the speed of light.

For example, distance d can be calculated using the following formula:

$$d = (c * \Delta T)/2$$

The distance sensor 7C is also called time-of-flight sensor. Moreover, the distance sensor can convert the calculated distance d into an electrical signal to be sent to the control unit 7.

Figure 4:
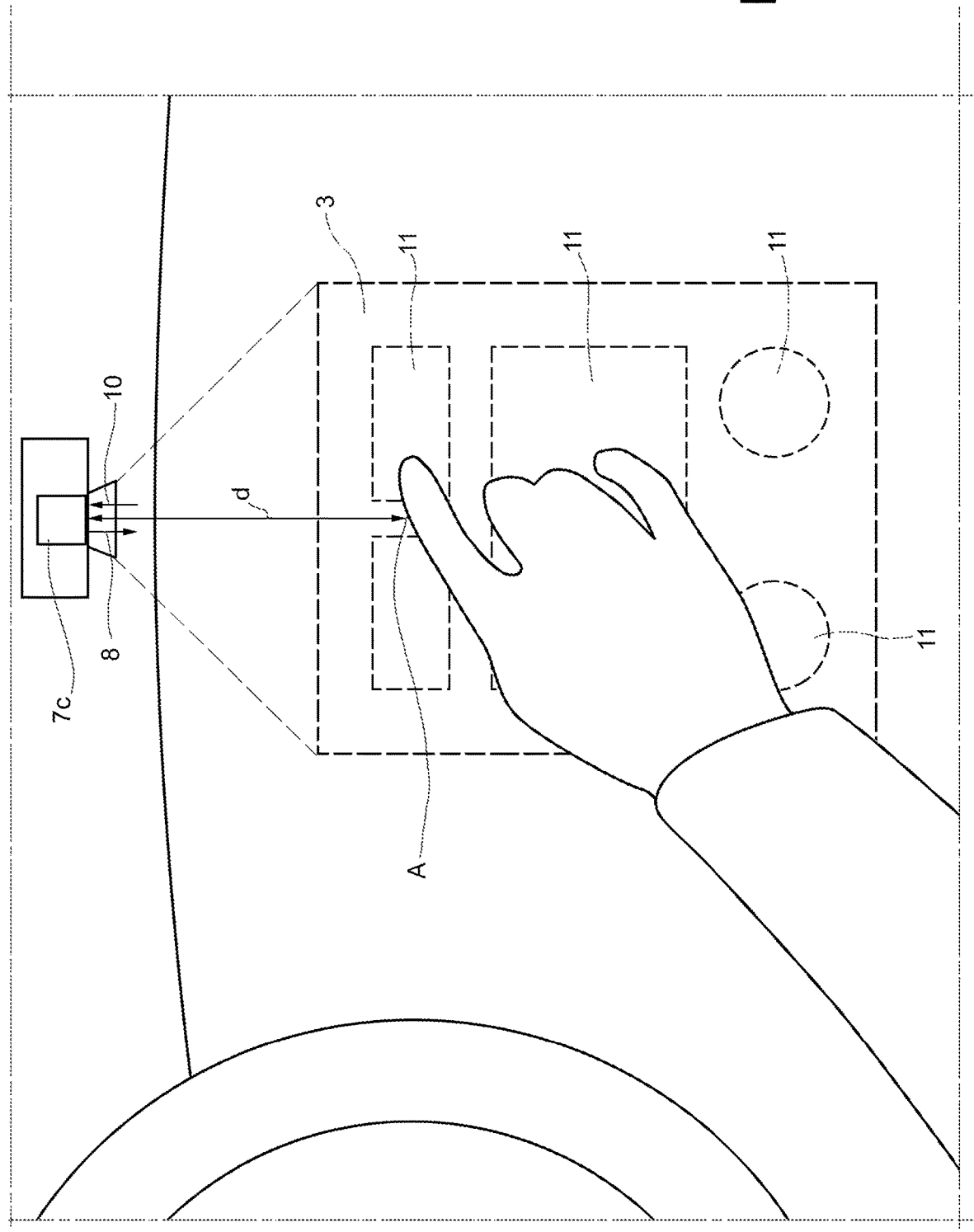
FIG. 4 shows by way of example a command given by a user via the virtual human-machine interface system.

To interact with the virtual panel, for example to choose the destination or to change the information to be displayed, the user can place his/her hand/finger on the desired part of the projection surface 3 (see FIG. 4). The distance sensor 7C, and/or the first vibration sensor, can transform the reflected signal 10 or the vibration signal of the virtual panel, with respect to the user's hand, into electrical signals which will be sent to the control unit 9. The algorithms inside the control unit will understand if and which virtual switch 11 of the projected image has been chosen by the user and, consequently, can perform the related operations, comprising editing the image to be projected to display another menu.

Some devices available on the market allow integrating the distance sensor 7C inside the projection device, giving a great advantage in terms of precision, cost and space occupation.

The virtual human-machine interface system may further comprise a second vibration sensor 7A and a third vibration sensor 7B, arranged to detect respectively vehicle vibrations transmitted to the projection surface 3 and vehicle vibrations transmitted to the projection device 5, to compensate the position of the image projected by said projection device 5 on the projection surface 3 as a function of the detected vibrations.

Vibrations may be due, for example, to the vehicle engine or to a bumpy and uneven road surface.

As an example, in the embodiment of FIG. 2, the second vibration sensor 7A is associated with a projection surface 3 and the third vibration sensor 7B is associated with a projection device 5 projecting onto said projection surface 3 a which is associated with the second vibration sensor 7A.

The control unit 9 can receive the vibration information from such second and third vibration sensors 7A, 7B in order to perform algorithms for compensating the position of the image on the projection surface 3.

In a further embodiment, in the aforementioned case in which at least one sensor 7 is a first vibration sensor, the first vibration sensor may also perform the function of said second vibration sensor 7A. In this case, the first vibration sensor will be arranged both to detect the vibrations generated by a part of the user's body in contact with the projection surface 3 and to detect the vehicle vibrations transmitted to the projection surface 3, and the virtual human-machine interface system may comprise a single additional vibration sensor 7B, i.e. the third vibration sensor 7B in the preceding case, arranged to detect the vehicle vibrations transmitted to the projection device 5, to compensate the position of the image projected by said projection device 5 on the projection surface 3 as a function of such detected vibrations.

In yet a further embodiment, the human-machine interface system 1 may allow enlarging or reducing the dimension of the projected image, or of at least a portion of the projected image, by approaching or moving away two parts of the user's body in contact with the projection surface on which the image is projected and that are sliding on said projection surface. The above-described sensors may be used to detect this command as well as to detect a dragging action of the projected image described in the preceding paragraphs.

The present invention further relates to a virtual human-machine interface method for a vehicle including at least one projection surface 3 disposed within the vehicle.

The human-machine interface method is controlled by a control unit 9 and comprises the following steps:

projecting an image on the at least one projection surface 3 by a micro-mirror projection device 5;

detecting commands given by a user by determining the position of a part of the user's body within the vehicle by at least one sensor 7; and changing the position of the image projected by the at least one projection device 5 inside the vehicle by a specific command given by the user.

The method may further comprise the step of enlarging or reducing the dimension of the projected image, or of at least a portion of the projected image, by approaching or moving away two parts of the user's body that are in contact with the projection surface on which the image is projected and are sliding on said projection surface.

In this way, for example, the user may display the size of the writing of the displayed image in a customized manner. This can be particularly useful for visually impaired users or for users with other vision problems.

The advantages achieved are therefore being able to use algorithms and components that are not complex, projecting images even on non-flat surfaces, avoiding installation of touch screens and switches, not being influenced by direct exposure to the sun and by vehicle vibrations, and allowing a high degree of customization.

Various aspects and embodiments of a virtual human-machine interface system for a vehicle and of a corresponding virtual human-machine interface method for a vehicle according to the present invention have been described. It is understood that each embodiment may be combined with any other embodiment.

The invention, moreover, is not limited to the described embodiments, but may be varied without departing from the scope of protection described herein.

The invention claimed is:

1. A virtual human-machine interface system for a vehicle including at least a first projection surface and a second projection surface disposed within the vehicle;

said virtual human-machine interface system comprising:
at least one micro-mirror projection device for projecting an image on said first projection surface;
at least one distance sensor ToF for detecting commands given by a user by determining a distance (d) from the part of the user's body by the distance sensor, when placed between said distance sensor and the projection surface; and
a control unit for controlling said virtual human-machine interface system;
the position of the image projected by the at least one projection device within the vehicle being modifiable by a specific command given by the user; and
the image projected by said at least one micro-mirror projection device being moved from the first projection surface to the second projection surface by the user through said specific command.

2. The virtual human-machine interface system as set forth in claim 1, wherein the specific command given by the user to modify the position of the projected image inside a passenger compartment is a dragging action of the projected image by a part of the user's body.

3. The virtual human-machine interface system as set forth in claim 1, wherein the projected image, or at least a portion of the projected image, is enlarged or reduced by a specific command which involves approaching or moving away two parts of the user's body that are in contact with the projection surface on which the image is projected and which slide on said projection surface.

4. The virtual human-machine interface system as set forth in claim 1, wherein the projection device projects an image on at least one non-flat projection surface.

5. The virtual human-machine interface system as set forth in claim 1, wherein at least one sensor is a first vibration sensor arranged to detect vibrations generated by a part of the user's body contacting a projection surface, so as to detect the position of the part of the user's body and determine a respective command given by said user.

6. The virtual human-machine interface system as set forth in claim 1, wherein said distance sensor is arranged for:
generating an electromagnetic wave;
receiving an electromagnetic wave reflected from a reflection area included on a part of the user's body placed between said distance sensor and the projection surface, or, an electromagnetic wave reflected directly from a reflection area included in the projection surface when no part of the user's body is placed between said distance sensor and the projection surface;
measuring a time ΔT between generation of the electromagnetic wave and reception of the reflected electromagnetic wave by the distance sensor;
calculating a distance (d) between the reflection area and the sensor distance according to said time ΔT and speed of light;
converting the calculated distance (d) into an electrical signal to be sent to the control unit.

7. The virtual human-machine interface system as set forth in claim 6, wherein the distance (d) is calculated by the following formula:

$$d=(c*\Delta T)/2.$$

8. The virtual human-machine interface system as set forth in claim 1, wherein the projection device projects an image on a projection surface disposed on a vehicle door or on a vehicle dashboard, or disposed in front of a vehicle steering wheel or on an instrument panel of the vehicle or on an internal roof of the vehicle.

9. The virtual human-machine interface system as set forth in claim 1, wherein the projection device and the control unit comprise a communication module communicate with each other.

10. The virtual human-machine interface system as set forth in claim 1, further comprising a second vibration sensor and a third vibration sensor to detect respectively vehicle vibrations transmitted to the projection surface and vehicle vibrations transmitted to the projection device, to compensate the position of the image projected by said projection device on the projection surface as a function of the detected vibrations.

11. A virtual human-machine interface method for a vehicle including at least a first projection surface and a second projection surface disposed within the vehicle;
said human-machine interface method being controlled by a control unit and comprising the steps of:
projecting an image on said first projection surface by a micro-mirror projection device and enlarging or reducing dimensions of the projected image, or of at least a portion of the projected image, by approaching or moving away two parts of the user's body that are in contact with the projection surface on which the image is projected and that slide on said projection surface;
detecting commands given by a user by determining a position of a part of the user's body within the vehicle by at least one sensor; and
changing the position of the image projected by said at least one micro-mirror projection device inside the vehicle, from the first projection surface to the second projection surface, by a specific command given by the user.

* * * * *